United States Patent
Han et al.

(10) Patent No.: US 9,202,099 B2
(45) Date of Patent: Dec. 1, 2015

(54) FINGERPRINT SENSING AND ENROLLMENT

(71) Applicant: Apple Inc., Cupertio, CA (US)

(72) Inventors: Byron B. Han, Cupertino, CA (US); Craig A. Marciniak, San Jose, CA (US); Wayne C. Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/798,025

(22) Filed: Mar. 12, 2013

(65) Prior Publication Data

US 2014/0003677 A1     Jan. 2, 2014

Related U.S. Application Data

(60) Provisional application No. 61/666,745, filed on Jun. 29, 2012.

(51) Int. Cl.
*G06K 9/00* (2006.01)
*G06K 9/03* (2006.01)

(52) U.S. Cl.
CPC ........ *G06K 9/00006* (2013.01); *G06K 9/00013* (2013.01); *G06K 9/036* (2013.01)

(58) Field of Classification Search
None
See application file for complete search history.

(56) References Cited

U.S. PATENT DOCUMENTS

| | | | |
|---|---|---|---|
| 3,863,219 A | 1/1975 | Rohrer | |
| 5,828,773 A | 10/1998 | Setlak et al. | |
| 6,323,846 B1 | 11/2001 | Westerman et al. | |
| 6,546,152 B1 | 4/2003 | Hou | |
| 6,570,557 B1 | 5/2003 | Westerman et al. | |
| 6,677,932 B1 | 1/2004 | Westerman | |
| 6,788,340 B1 | 9/2004 | Chen et al. | |
| 6,795,569 B1 | 9/2004 | Setlak et al. | |
| 6,888,536 B2 | 5/2005 | Westerman et al. | |
| 6,987,520 B2 | 1/2006 | Criminisi et al. | |
| 7,110,581 B2 | 9/2006 | Xia et al. | |

(Continued)

FOREIGN PATENT DOCUMENTS

| | | |
|---|---|---|
| WO | WO 2012/008168 | 1/2012 |
| WO | WO 2012/009791 | 1/2012 |

OTHER PUBLICATIONS

Rajanna et al., "A comparative study on feature extraction for fingerprint classification and performance improvements using rank-level fusion," *Pattern Anal. Applic.*, published online Apr. 28, 2009, DOI 10.1007/s10044-009-0160-3, 10 pages.

(Continued)

*Primary Examiner* — Sumati Lefkowitz
*Assistant Examiner* — David Perlman
(74) *Attorney, Agent, or Firm* — Brownstein Hyatt Farber Schreck, LLP

(57) ABSTRACT

A sequence of biometric data images is received, such as, for example, a sequence of fingerprint images, and a set of biometric data images is selected from the sequence of images. The set of images can include one or more segments of at least one image in the sequence of images. One or more portions of at least one image of biometric data in the set of images can be selected to be included in the unified image of biometric data. The unified image of biometric data can be constructed using the one or more portions of the at least one image of biometric data. If the unified image of biometric data is not complete, a user can be prompted for one or more additional images of biometric data.

24 Claims, 5 Drawing Sheets

(56) References Cited

U.S. PATENT DOCUMENTS

| | | |
|---|---|---|
| 7,194,115 B2 | 3/2007 | Uchida |
| 7,194,116 B2 | 3/2007 | Du et al. |
| 7,401,056 B2 | 7/2008 | Kam |
| 7,424,218 B2 | 9/2008 | Baudisch et al. |
| 7,574,022 B2 | 8/2009 | Russo |
| 7,616,787 B2 | 11/2009 | Boshra |
| 7,634,117 B2 | 12/2009 | Cho |
| 7,692,693 B2 | 4/2010 | Misawa |
| 7,746,375 B2 | 6/2010 | Ketelaars et al. |
| 7,804,984 B2 | 9/2010 | Sidlauskas et al. |
| 7,853,053 B2 | 12/2010 | Liu et al. |
| 7,874,485 B2 | 1/2011 | Meier et al. |
| 7,876,310 B2 | 1/2011 | Westerman et al. |
| 7,903,847 B2 | 3/2011 | Higuchi |
| 7,974,475 B1 | 7/2011 | Minter |
| 8,032,758 B2 | 10/2011 | Tian |
| 8,077,935 B2 | 12/2011 | Geoffroy et al. |
| 8,090,163 B2 | 1/2012 | Schuckers et al. |
| 8,125,543 B2 | 2/2012 | Cho |
| 8,131,026 B2 | 3/2012 | Benkley et al. |
| 8,145,656 B2 | 3/2012 | Shatz et al. |
| 8,154,628 B2 | 4/2012 | Ishida et al. |
| 8,170,346 B2 | 5/2012 | Ludwig |
| 8,180,118 B2 | 5/2012 | Neil et al. |
| 8,295,560 B2 | 10/2012 | Abiko |
| 8,300,904 B2 | 10/2012 | Chen et al. |
| 8,306,288 B2 | 11/2012 | Rahmes et al. |
| 8,358,815 B2 | 1/2013 | Benkley et al. |
| 8,408,456 B2 | 4/2013 | Weintraub et al. |
| 8,515,139 B1 * | 8/2013 | Nechyba et al. .............. 382/118 |
| 8,605,960 B2 | 12/2013 | Orsley |
| 8,631,243 B2 | 1/2014 | Baldan et al. |
| 8,705,813 B2 | 4/2014 | Matsuyama et al. |
| 8,787,631 B2 | 7/2014 | Abiko |
| 8,837,786 B2 | 9/2014 | Hwang et al. |
| 8,897,568 B2 | 11/2014 | Miyano |
| 9,134,902 B2 | 9/2015 | Kang et al. |
| 2002/0012455 A1 | 1/2002 | Benckert |
| 2003/0123715 A1 * | 7/2003 | Uchida .......................... 382/124 |
| 2005/0244039 A1 * | 11/2005 | Geoffroy et al. .............. 382/126 |
| 2008/0276089 A1 * | 11/2008 | Tian .............................. 713/168 |
| 2009/0279745 A1 | 11/2009 | Liautaud |
| 2010/0080425 A1 | 4/2010 | Bebis et al. |
| 2010/0189310 A1 * | 7/2010 | Liu et al. ....................... 382/107 |
| 2010/0232654 A1 | 9/2010 | Rahmes et al. |
| 2010/0232659 A1 | 9/2010 | Rahmes et al. |
| 2011/0274356 A1 | 11/2011 | Tasdizen et al. |
| 2011/0279664 A1 | 11/2011 | Schneider et al. |
| 2011/0311112 A1 * | 12/2011 | Matsuyama et al. ......... 382/118 |
| 2012/0045138 A1 * | 2/2012 | Cote .............................. 382/232 |
| 2012/0155718 A1 * | 6/2012 | Hwang et al. ................ 382/118 |
| 2013/0004096 A1 * | 1/2013 | Goh et al. ..................... 382/260 |
| 2013/0053107 A1 | 2/2013 | Kang et al. |
| 2013/0083074 A1 | 4/2013 | Nurmi et al. |
| 2013/0108125 A1 | 5/2013 | Storm et al. |
| 2013/0128121 A1 | 5/2013 | Agarwala et al. |
| 2013/0272586 A1 | 10/2013 | Russo |
| 2013/0294660 A1 | 11/2013 | Heilpern et al. |
| 2013/0308838 A1 | 11/2013 | Westerman et al. |
| 2014/0003677 A1 | 1/2014 | Han et al. |
| 2014/0056493 A1 | 2/2014 | Gozzini |
| 2014/0212010 A1 | 7/2014 | Han et al. |
| 2014/0226879 A1 | 8/2014 | Westerman et al. |
| 2014/0241595 A1 | 8/2014 | Bernstein et al. |
| 2014/0267659 A1 | 9/2014 | Lyon et al. |

OTHER PUBLICATIONS

Author Unknown, "Fingerprint Recognition," National Science and Technology Council (NSTC), Committee on Technology, Committee on Homeland and National Security, Subcommittee on Biometrics, Aug. 7, 2006, 13 pages.

* cited by examiner

FINGERPRINT SENSING AND ENROLLMENT

CROSS-REFERENCE TO RELATED APPLICATION

The present application claims the benefit under 35 U.S.C. §119(e) to U.S. Provisional Patent Application No. 61/666,745, which was filed on Jun. 29, 2012, and entitled "Fingerprint Sensing and Enrollment," which is incorporated by reference as if fully disclosed herein.

TECHNICAL FIELD

This application generally relates to fingerprint imaging.

BACKGROUND

Capacitive sensing of fingerprints provides for collection of fingerprint information in two dimensions, such as an image of a fingerprint, or portion thereof. More specifically, capacitive sensing allows a fingerprint recognition device to determine the ridges and valleys of the user's finger, in response to relative capacitances measured between the user's finger (such as on the epidermis of the user's finger) and a capacitive plate in the fingerprint recognition device.

A first problem in the known art is that, should the user's finger be positioned incorrectly, or even merely non-optimally, the fingerprint image collected by the fingerprint recognition device may fail to be fully adequate. For a first example, when the user's finger is too far from the fingerprint recognition device, or when the user's finger exerts too much pressure on the fingerprint recognition device, the fingerprint image may have inadequate resolution or be too blurry. For a second example, the user's finger may be positioned with only part of the finger in proper position to be sensed, with the effect that only a partial fingerprint image is collected by the fingerprint recognition device. For a third example, the user's finger may be oriented improperly or at an unexpected or unusual direction with respect to the fingerprint recognition device, with the effect that the fingerprint image, while otherwise reasonably crisp and complete, is not easily identified.

A second problem in the known art is that the fingerprint image collected by the fingerprint recognition device may be subject to noise. Noise can result from multiple sources. For a first example, noise can result from ambient electromagnetic noise near the fingerprint recognition device. For a second example, noise can result from electromagnetic noise within the circuitry of the fingerprint recognition device. For a third example, noise can result from dust or other particulate matter interfering with operation of the fingerprint recognition device. Noise can interfere with the quality of the fingerprint image, such as by altering the ridges and valleys identified by the fingerprint image.

Each of these examples, as well as other possible problems, can cause difficulty for the fingerprint recognition device. For a first example, the fingerprint recognition device may have difficulty collecting adequate fingerprint information from the user, with the effect that enrollment of the user's fingerprint image for later recognition can be impaired, or if the user's fingerprint has already been enrolled by the fingerprint recognition device, with the effect that recognition of the user's fingerprint image can be impaired. For a second example, the fingerprint recognition device may have difficulty correlating multiple fingerprints from the user, with the effect that determining a reliable fingerprint for later recognition can be impaired.

SUMMARY

This application provides techniques, including computer-implemented methods and computing systems, which can receive information with respect to fingerprint images, collect and correlate that information, construct aggregate data in response to that information, and present information to a user with respect to interacting with a device that can receive that information.

In one embodiment, techniques include methods which use a sequence of fingerprint images, each either full or partial images, and which correlate elements of those fingerprint images. For example, a movie or video image sequence, or another type of sequence of fingerprint images, can be correlated with respect to identifiable features thereof, with the effect that the correlated information can be collected into a relatively reliable individual fingerprint image. Once the individual fingerprint images have been correlated, matching pixels of those images can be averaged (or otherwise statistically treated), with the effect of providing an aggregated fingerprint image which is responsive to that sequence of fingerprint images.

In one embodiment, techniques include methods which determine a measure of quality for each fingerprint image from a set thereof, each either full or partial images, and which aggregate an individual fingerprint image in response to those measures of quality. For example, fingerprint images can have a subset selected from a set thereof, with respect to which ones of those fingerprint images have superior completeness, resolution, quality of match, or other desired features. Once the subset of fingerprint images with best quality is selected, that subset can be more easily correlated into a relatively reliable individual fingerprint image.

In one embodiment, techniques include methods which attempt to remove noise from fingerprint image information. For example, noise introduced by bit-errors at specific locations in 2D fingerprint information can be removed by filtering or blurring. An amount of filtering or blurring imposed on the 2D fingerprint information is responsive to a measure of contrast in the fingerprint image information, and a measure of aliasing to be imposed on pixels in the fingerprint image information. An amount of filtering or blurring imposed on the 2D fingerprint information is also dynamically adjusted in response to those factors, or in response to a measure of resulting quality of the fingerprint image information.

In one embodiment, techniques include methods which aggregate a complete fingerprint image for a user, in response to a set of partial 2D fingerprint images, the aggregation including matching, overlap, and statistical elements. For example, partial fingerprint images which include 2D patches of fingerprint information, each gleaned from an individual fingerprint image, either full or partial, in a sequence of fingerprint images. Once the complete fingerprint image is aggregated from a set of partial 2D fingerprint images, the complete fingerprint image can be used for enrollment of the user's fingerprint image, or for recognition and authentication of the user.

In one embodiment, techniques include methods which give the user information about collection of fingerprint image information, including user interaction with a device that can receive image information. For example, information presented to the user can include whether the user's finger is well positioned, such as whether the user's finger is too far away or too close (including whether the user is exerting too little or too much pressure on the device), whether the user's finger is well oriented (including whether the user's finger is sufficiently still with respect to the device), and whether enough information has been collected (including identifying regions of the user's fingerprint which have been adequately imaged). In a first example, those portions of the user's fingerprint which have been adequately imaged can be presented on a screen associated with the device. In a second example, feedback suggesting that the user move their finger in a designated manner to allow for reception of further information or better information, such as asking the user for particular roll, pitch, yaw or twist, movement or translation, or pressure, of their finger.

In one embodiment, techniques include a computing system including a processor, a data storage medium, a display, and software, wherein the software can cause the computing system to perform methods and techniques described herein. In one embodiment, techniques include computer-implemented methods according to the system and techniques described herein. In one embodiment, a computer readable medium, which may include computer-executable instructions configured to cause a computer to perform methods and techniques described herein.

In one embodiment, a method for constructing a unified image of biometric data can include receiving a sequence of images of biometric data and selecting a set of images of biometric data from the sequence of images. Each image in the sequence can be received at a defined time. The set of images can include one or more segments of at least one image in the sequence of images. One or more portions of at least one image of biometric data in the set of images can be selected to be included in the unified image of biometric data. The unified image of biometric data can be constructed using the one or more portions of the at least one image of biometric data.

In one embodiment, a method for constructing and using a unified image of biometric data can include receiving a sequence of images of biometric data and selecting a set of images of biometric data from the sequence of images. The set of images can include at least one segment of one or more images of biometric data in the sequence of images. One or more portions of at least one image of biometric data in the set of images can be selected to be included in the unified image of biometric data. The unified image of biometric data can be constructed using the one or more portions of the at least one image of biometric data, and the unified image of biometric data can be enrolled, where the enrollment includes associating the unified image of biometric data with a user. A subsequently received image of biometric data can be recognized and authenticated by determining if the image of biometric data matches at least a portion of the unified image of biometric data.

In one embodiment, a system can include a biometric recognition sensor that includes a sensing element adapted to receive a sequence of images of biometric data, and a processor connected to the sensing element. The processor can be adapted to select a set of images of biometric data from the sequence of images of biometric data and construct a unified image of biometric data using one or more portions of at least one image of biometric data in the set of images of biometric data. The set of images of biometric data can include one or more segments of at least one image of biometric data in the sequence of images. A display can be connected to the processor for displaying to a user a prompt for collecting one or more additional images of biometric data. It should be appreciated that embodiments described herein may be used with any suitable fingerprint sensor, including swipe or strip sensors, two-dimensional array sensors, and the like.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

Figure 1:
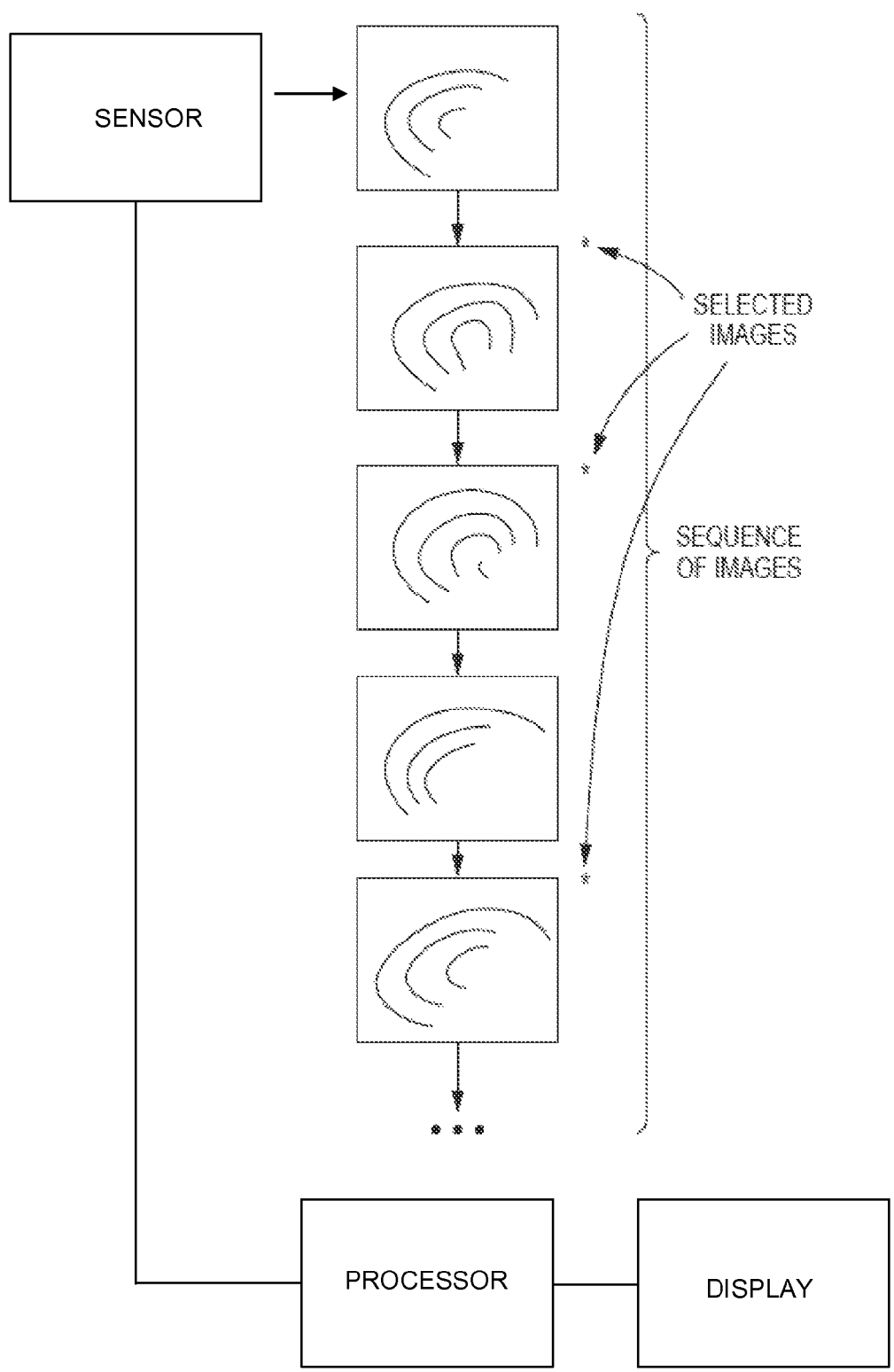
FIG. 1 shows a conceptual drawing of an example sequence of fingerprint images.

As described herein, a biometric data recognition sensor can perform recognition of biometric images. For example, a fingerprint recognition sensor can perform recognition of 2D fingerprint images. The recognition sensor can be used, for example, to authenticate a user, and if authenticated, provide the user with access to data or a device or system. A sequence of images of biometric data (e.g., fingerprint images) can be received. For example, a sensing element, such as a capacitive sensing touchscreen, can operate to receive fingerprint images periodically, at a relatively rapid rate, during a time when the user's finger is approaching the fingerprint sensor, at or near the fingerprint sensor, or leaving the fingerprint sensor. For example, the sensing element can operate to receive a fingerprint image each 100 milliseconds (or at some other frame rate).

A set of images of biometric data can be selected from the sequence of images. The set of images can include one or more segments of at least one image in the sequence of images. By way of example only, if the sequence of images includes 100 images, 43 images can be selected for further processing.

One or more portions of at least one image in the set of images can be selected to be included in the unified image of biometric data. A location for each individual image or a portion of an image in a unified image can be determined. For example, one or more individual images can each be individually offset with respect to other individual images, to achieve proper overlap of identified features of those individual images.

The unified image of biometric data can be constructed using the one or more portions of the at least one image of biometric data. If the unified image of biometric data is not complete, a user can be prompted for one or more additional images of biometric data. An image can be presented to a user displaying portions of the unified image that have yet to be collected, or which have been collected but can be improved upon. A user can be presented with readable instructions, such as in the form of text, or pictorial instructions, such as in the form of an arrow or other icon or pictograph, directing the user how to improve on the user's fingerprint image.

A unified image or a portion of a unified image can be constructed by aggregating individual fingerprint images, on a per-pixel basis, for those pixels which are substantially co-located. For example, when two individual images overlap, there can be pixels in those two individual images that are substantially co-located and which can be aggregated. Individual co-located pixels can be aggregated, for example, by averaging the grayscale values for those pixels. If there are n such co-located pixels, the processor can perform an arithmetic average of the grayscale values, that is, adding their values and dividing by n.

The biometric data recognition sensor can operate in combination or in conjunction with a processor. Other embodiments are not limited to the use of a processor. For example, a fingerprint recognition sensor can operate in combination or conjunction with circuitry specially adapted to the purposes or steps described herein, or in combination or conjunction with more than one such processor, or in combination or conjunction with one or more elements of each type, such as for distinct steps or portions thereof.

While embodiments disclosed herein primarily describe a fingerprint recognition sensor that is responsive to an individual user and that individual user's fingerprint, other embodiments are not limited to this implementation. For example, a device or system including a fingerprint recognition sensor can operate to distinguish between multiple users in response to their fingerprints. In one example, a device can recognize a user attempting to access the device and authenticate the user for one or more distinct levels of authentication, in response to fingerprint recognition for one of a set of authorized users. For example, the device can recognize the user's fingerprint and authenticate the user from a set of possible authorized users in response to a swipe gesture for unlocking the device.

In another example, the device can recognize a user attempting to access the device after the device has been locked by a different user, or by a user with a different level of authentication. For example, the device can recognize the user's fingerprint and determine whether to allow access in response to whether the device was locked by a different user.

In another example, the device can recognize a user attempting to access the device in response to the user's fingerprint, and can determine whether or not to require additional authentication in response to whether the user's fingerprint is recognized, or in response to which user's fingerprint is recognized.

Those skilled in the art will recognize that the techniques described herein are broadly applicable to methods and devices involving biometric data (e.g., fingerprint) recognition, and such other methods and devices can be workable given the disclosure herein, that such other methods and devices can be within the scope and spirit of the invention.

FIG. 1 shows a conceptual drawing of an example sequence of fingerprint images. In one embodiment, a fingerprint sensor includes a capacitive sensing element capable of obtaining one or more 2D fingerprint images. Each 2D fingerprint image includes a set of pixels, each pixel representing a relative distance of an epidermis of the user's finger, such as a ridge or a valley that may be defined by the user's finger, where the collection of ridges and valleys describes a fingerprint.

While the embodiments disclosed herein primarily describe a fingerprint sensor which uses a capacitive sensing element, there is no particular requirement for any such limitation. For one example, a biometric data (e.g., fingerprint) sensor can use an optical sensing element, which can operate by determining an optical view of an epidermis of the user's finger, with the effect of sensing the ridges and valleys which define a fingerprint. The fingerprint sensor may also operate using a combination or conjunction of more than one type of sensing element, such as by using both a capacitive sensing element and an optical sensing element to obtain a combined fingerprint image.

While the embodiments disclosed herein primarily describe a fingerprint sensor that is responsive to a surface of the epidermis of the user's finger, there is no particular requirement for any such limitation. For example, a capacitive sensing element may possibly obtain a capacitive image of the user's finger which is responsive to portions of the user's finger which includes subcutaneous elements. For further examples, an optical sensing element or another sensing element may obtain an image of the user's finger which is responsive to portions of the user's finger which includes subcutaneous elements.

The sensing element can operate to capture or receive a sequence of 2D fingerprint images, with each image being received at a defined time. The sensing element can operate to receive such fingerprint images periodically, at a relatively rapid rate, during a time when the user's finger is approaching the fingerprint sensor, at or near the fingerprint sensor, or leaving the fingerprint sensor. For example, the sensing element can operate to receive a fingerprint image each 100 milliseconds (or at some other frame rate), with the effect of producing a sequence of fingerprint images, similar to a video image of the user's finger approaching, present at, or departing, the fingerprint sensor.

In one embodiment, the fingerprint sensor is coupled to a processor, which is capable of receiving one or more 2D fingerprint images. The processor receives those images in a digitized format, such as a sequence of black-and-white images or grayscale images representative of the video image of the user's finger approaching the sensing element. Each individual fingerprint image of the video image is sometimes referred to herein as a "frame". In one embodiment, the fingerprint image information from the video image is encrypted or otherwise secured for transfer from the fingerprint sensor to the processor.

The processor can select a set of frames for further processing. For example, if the video image includes approximately 100 frames, the processor can select about 50 superior frames for further processing. While the rate at which frames are captured, the number of captured frames, the proportion of captured frames selected by the processor, and the number of selected frames, are all provided here as example embodiments, there is no particular requirement for any such limitation. For example, other frame rates, numbers of captured frames, selected proportions of captured frames, and number of selected frames are all within the scope and spirit of the invention.

In one embodiment, the processor can select those superior frames by selecting a sliding window of frames, such as (for example) a sliding window of 10 frames, and selecting, from the set of frames embodied by that sliding window, those frames which are best suited for use. For one example, with a sliding window of 10 frames, the processor may select frame number 2 as having the best quality of frames 1-10, then select frame 5 as having the best quality of remaining ones of frames 2-11, then select frame 6 as having the best quality of remaining ones of frames 3-12, and so on. While the particular size of the sliding window is provide here as an example embodiment, there is no particular requirement for any such limitation. For example, other values can be used for the number of frames for the sliding window, or for the degree of overlap. Moreover, the size of the sliding window can be adjusted by the processor in response to the frame rate, number of captured frames, in proportion of captured frames to be selected, the number of selected frames, or other factors.

In one embodiment, the processor can select those frames having superior measures of quality. For example, the processor can identify those frames which are most complete, least subject to blur, least subject to noise or other error components, and otherwise. In one example, the processor also identifies those frames which can benefit from anti-aliasing, blurring, filtering, or other signal processing.

In one embodiment, when selecting frames for best quality, the processor can select those frames most capable of being joined, such as finding those frames having identifiable features, and selecting those frames in which those identifiable features are most capable of being matched. For example, matching of individual frames of fingerprint image information is further described below.

In one embodiment, when selecting frames for best quality, the processor can select those frames most effective at providing fingerprint image information to form a substantially complete fingerprint image. For example, obtaining missing or insufficient fingerprint image information is further described below.

Having selected those frames having superior measures of quality, the processor can correlate those images and averages them to form a collected image. In one embodiment, as described below, the processor can identify elements of those images, align the images so that those identified elements are matched, and perform filtering on the images before averaging them.

Figure 2:
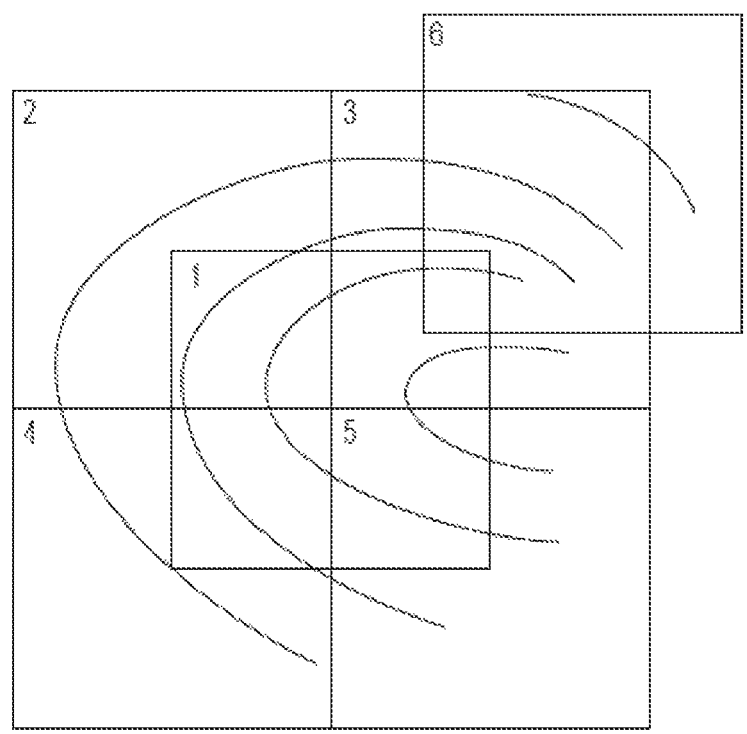
FIG. 2 shows a conceptual drawing of an example of constructing an aggregate image from a sequence of fingerprint images.

FIG. 2 shows a conceptual drawing of an example of constructing an aggregate image from a sequence of fingerprint images. In one embodiment, the processor can identify those portions of a unified image that should be collected. For a first example, a portion of a unified image may be missing, such as because the user's finger was not brought close enough or did not exert enough pressure to generate a complete fingerprint image. For a second example, a portion of a unified image may be blurred, such as due to movement by the user's finger or due to some electrostatic effect during imaging by the fingerprint recognition sensor.

The processor can identify, for each individual image, where it should be placed in a unified image. For example, one or more individual images can each be individually offset with respect to other individual images, to achieve proper overlap of identified features of those individual images. In some cases, pairs of individual images can be distinct, with the effect of having no overlapping portions, such as for individual images 4 and 6 shown in the figure. In some cases, pairs of individual images can have at least some overlap, such as for individual images 1 and 4 shown in the figure.

In one embodiment, the processor can find identifiable features in each individual image, and match those identifiable features when offsetting the individual frames with respect to each other. For a first example, the processor can identify a particular ridge flow, and match the individual frames with respect to positioning of that ridge flow after offset, with the effect that a need for further offset is minimized. For a second example, the processor can identify a degree of match between individual frames after offset, with the effect that an amount of further change due to averaging, or further offset, is minimized.

Figure 3:
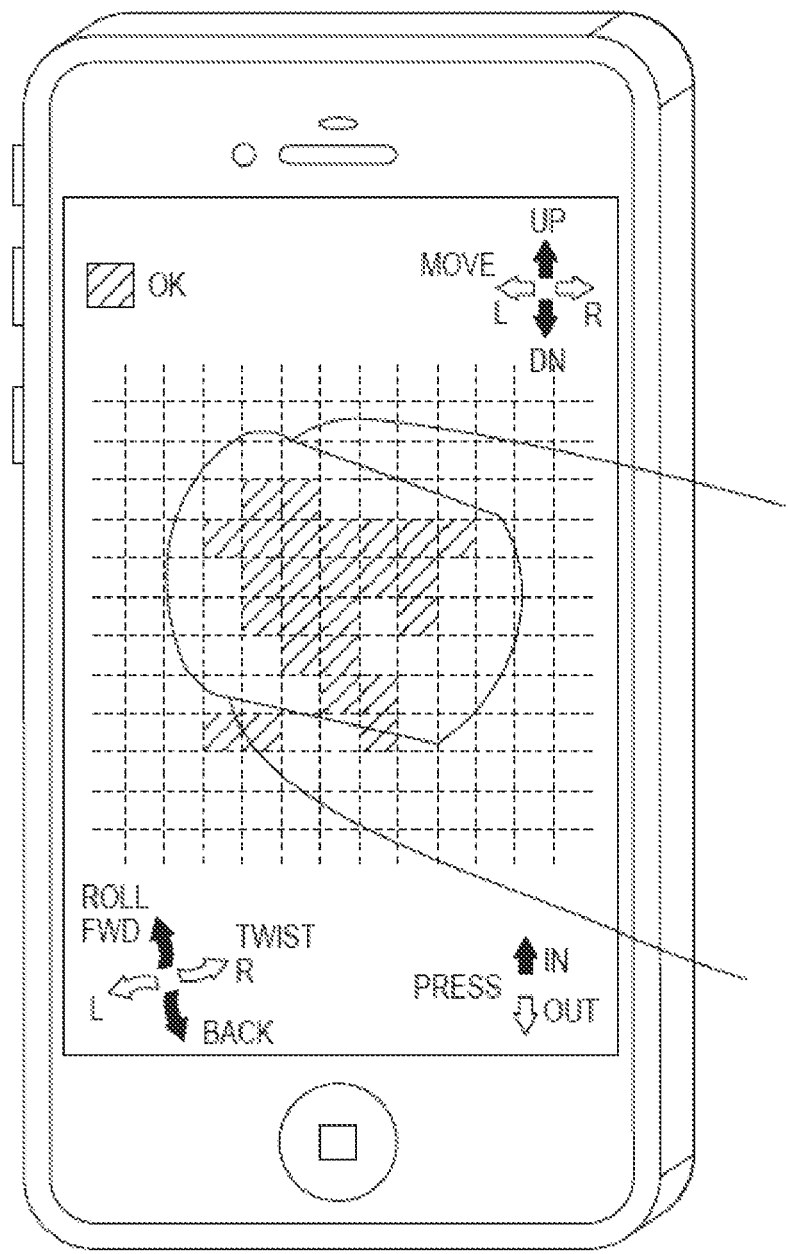
FIG. 3 shows a conceptual drawing of an example of presenting information to a user with respect to interacting with an image receiving device.

FIG. 3 shows a conceptual drawing of an example of presenting information to a user with respect to interacting with an image receiving device. In one embodiment, the user submitting the fingerprint, such as by pressing their finger to the fingerprint recognition sensor, can be presented with information from the processor with respect to whether the user's fingerprint image information can be improved by further collection of fingerprint image information. For a first example, the user's fingerprint image information may be incomplete, or blurry, or subject to noise or other error components, or otherwise subject to improvement. For a second example, the processor may have determined that there were not an adequate number of frames having superior measures of quality, and decided to request the user to submit additional information with respect to the user's fingerprint.

In one embodiment, the processor can identify those portions of the unified image which have yet to be collected, or which have been collected but can be substantially improved upon. Some examples are described above with respect to those portions of the unified image which should be collected. Some examples are also described above with respect to aspects of portions of the unified image which can be improved upon.

In one embodiment, the processor can present an image to the user with respect to those portions of the unified image which have yet to be collected, or which have been collected but can be substantially improved upon. For example, as shown in the figure, the processor can present the user with an image showing those portions of the unified image which the processor requests the user to improve upon, such as by again bringing the user's fingerprint into contact or near-contact with the fingerprint recognition sensor.

For a first example, a portion of a unified image may be missing, such as because the user's finger was not brought close enough or did not exert enough pressure to generate a complete fingerprint image. For a second example, a portion of a unified image may be blurred, such as due to movement by the user's finger or due to some electrostatic effect during imaging by the fingerprint recognition sensor.

Examples of missing portions can include edges of the fingerprint image, such as may be left by a user by inadequate closeness to or pressure on the fingerprint sensor; sides of the fingerprint image, such as may be left by a user by failure to properly position or angle the user's finger on the fingerprint sensor; and "holes" in a middle of the fingerprint image, such as may be left in response to dust, noise or obstructions. In one embodiment, the processor can maintain a record of those portions of the fingerprint image which can be tiled together, and select those frames most effective at covering those tiles.

In such cases, the processor can present the user with an image showing those portions of the user's fingerprint image which have been successfully collected (or alternatively, those portions of the user's fingerprint image which are substantially missing), and request the user to enter or improve upon desired portions of the user's fingerprint image.

Additionally or alternatively, in such cases, the processor can present the user with readable instructions, such as in the form of text, and/or pictorial instructions, such as in the form of an arrow or other icon or pictograph, directing the user how to improve on the user's fingerprint image.

For a first example, the processor can present the user with text or an arrow or other pictograph requesting the user to move their finger right or left, or up or down, with respect to the fingerprint recognition sensor, so as to collect fingerprint image information otherwise considered missing from the unified fingerprint image information.

For a second example, the processor can present the user with text or an arrow or other pictograph requesting the user to twist the tip of their finger with respect to the fingerprint recognition sensor, with the effect that the user's finger is properly oriented with respect to the fingerprint recognition sensor. In such cases, "properly oriented" includes an angle the user's finger may make with respect to the fingerprint recognition sensor, with respect to any one of a Z axis, an X axis or Y axis.

In such cases, with respect to the Z axis, the user's finger may be relatively flat with respect to a surface of the fingerprint recognition sensor, but may be improperly aligned, with the effect that the 2D fingerprint image information is angled with respect to other frames of 2D fingerprint image information.

In such cases, with respect to the X axis or Y axis, the user's finger may be relatively properly oriented in angle with respect to other frames of 2D fingerprint image information, but may exhibit right-left twist or yaw, or may exhibit forward-backward tilt, with respect to relatively flat and properly oriented fingerprint image information.

For a third example, the processor can present the user with text or an arrow or other pictograph requesting the user to bring their finger closer or farther from the fingerprint recognition sensor, or to exert more or less pressure on the surface of the assembly including the fingerprint recognition sensor, with the effect that the user's finger presents a relatively superior image of ridges and valleys of the user's fingerprint image information.

As yet another example, embodiments described herein may operate in the following manner. As a set of frames of a fingerprint is captured, generally through capacitive sensing, each frame may be analyzed to determine whether it is of sufficient resolution to be usable during an enrollment process. The embodiment may make such a determination for an entire fingerprint or for one or more portions or segments of a fingerprint.

As a segment of a fingerprint is determined to be both sensed and of sufficient resolution for enrollment and/or authentication, it may be displayed graphically on a display of an associated electronic device. The device may incorporate the sensor or may be physically separate from the sensor and/or the display. Typically, each portion of a fingerprint (or other sensed image) that is determined to be suitable may be shown as its suitability is confirmed.

As one example, a blank image of a fingerprint may be initially displayed. As the sensor captures frames of a user's fingerprint, the frames may be segmented and each segment individually analyzed for suitability, image quality and the like. As a segment is approved, it may be shown in the appropriate portion of the blank image. As more segments are captured, the blank image is filled in with each segment, such that the blank is eventually filled with an image of the user's fingerprint. As an alternative to displaying the actual fingerprint, shading, colors, and the like may be used to fill in the blank image.

Such an embodiment can provide substantially real-time feedback to a user and identify which portions of a finger may remain to be imaged and/or captured with sufficient detail to provide an entire fingerprint for enrollment, authentication and the like. The feedback may facilitate positioning the user's finger accurately to obtain images of missing segments, speed up the imaging process, clearly signal when the imaging process is complete, and provide other like benefits.

As with the original collection of fingerprint image information, the processor can collect, as described above, a set of frames for further processing, such as a video image of multiple frames, collected at a relatively rapid frame rate, and for which a sliding window of frames is identified, and from that sliding window of frames a set of relatively superior fingerprint image frames are selected by the processor.

Similarly, the processor can also present the user with either readable instructions and/or pictorial instructions informing the user of a relative measure of quality of the user's fingerprint image information, with the effect that the user has an idea of how well they have presented their fingerprint image for enrollment (as a new user) or recognition (as an enrolled user). This can have the effect that the user is less likely to be annoyed or confused in the event that the processor is not completely successful at enrolling or recognizing the user's fingerprint image information.

In some embodiments, the individual images of 2D fingerprint image information can include noise or other unwanted artifacts. For a first example, the individual ridges and valleys of the user's fingerprint may not be well aligned with the pixels of the fingerprint image information. In many cases, as the pixels of the 2D fingerprint image information form a 2D rectilinear array, it is likely that the individual ridges and valleys of the user's fingerprint will not be well aligned thereby. For a second example, noise elements may interfere with obtaining a relatively superior image of the user's fingerprint.

In one embodiment, the processor can examine the individual images of 2D fingerprint image information, and can determine if any operations can be performed to improve those images. Examples include anti-aliasing, blurring, filtering, and other signal processing operations.

In another embodiment, the processor can examine each individual image, and determine the degree of aliasing that is present in the image from pixel to pixel. This can have the effect that when the 2D fingerprint image information has a relatively larger number of adjacent pixels which exhibit aliasing, the processor can determine that the 2D fingerprint image information is subject to a relatively larger amount of aliasing, or possibly a relatively larger amount of noise or other unwanted effects.

In another embodiment, the processor can determine an amount of blurring to perform on the 2D fingerprint image information in response to the amount of aliasing that was determined. For example, a limited amount of blurring can be desirable to remove aliasing effects, such as may be removed by anti-aliasing, low-pass filtering, or similar signal processing techniques. However, an excessive amount of blurring may have the effect of removing substantial amounts of the 2D fingerprint image information, which can be undesirable.

In another embodiment, the processor can dynamically adjust the amount of blurring in response to the amount of aliasing that was determined. For example, with different amounts of aliasing for different individual images, the processor can determine different amounts of blurring to perform on those different individual images. This can have the effect that the processor can determine an amount of blur which is optimally desired for each individual image, and can perform only that optimally desired amount of blur for each such individual image.

The processor can determine the amount of blur present in the image by measuring the proportion of high-frequency components in the 2D fingerprint image information.

In one embodiment, the optimally desired amount of blur for different individual images can be responsive to an amount of blur necessary or convenient for matching individual images with other individual images. For example, if two substantially co-located individual images are two distinct to make a relatively good match, the processor may determine that additional blur is desirable, at least for those two individual images.

In one embodiment, the processor can perform other signal processing techniques with respect to individual images, also in response to statistical and other measures with respect to those individual images. For example, if one particular individual image exhibits a relatively excessive amount of noise, the processor may determine that a signal processing technique for removing noise (other than performing blur) should be performed with respect to that individual image.

In one embodiment, the processor can determine a unified fingerprint image by aggregating individual fingerprint images, on a per-pixel basis, for those pixels which are substantially co-located. For example, as described above, when two individual images have substantial overlap, there should be pixels in those two individual images which are substantially co-located and which can be aggregated.

In one embodiment, the processor can operate to aggregate individual co-located pixels by averaging the grayscale values for those pixels. For example, if there are n such co-located pixels, the processor can perform an arithmetic average of the grayscale values, that is, adding their values and dividing by n. In a first alternative, the processor can perform a weighted average, weighting each pixel's grayscale value by some measure of confidence in the individual image from which that pixel was selected. In a second alternative, the processor can select a median value or another value responsive to a statistical measure of the values of the co-located pixels.

Figure 4:
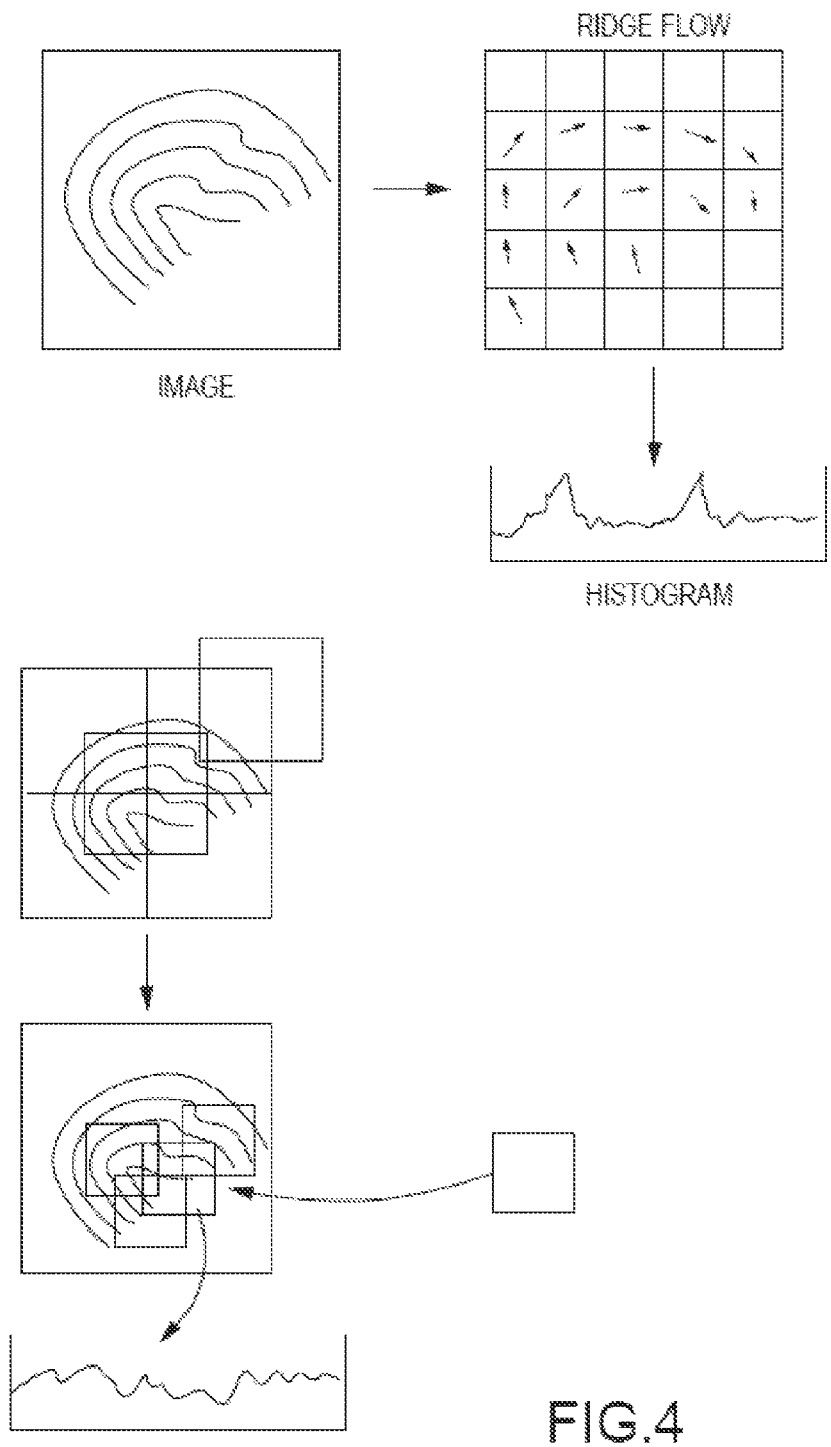
FIG. 4 shows a conceptual drawing of an example of a fingerprint recognition database.

FIG. 4 shows a conceptual drawing of an example of a fingerprint recognition database. In one embodiment, the processor can operate to transform the aggregate 2D fingerprint image into a relatively more compressed data structure, such as a data structure which can be maintained in less memory.

In another embodiment, the processor can operate to transform the aggregate 2D fingerprint image into a ridge flow data structure. For example, the ridge flow data structure can include an array of cells, each indicating whether a ridge (or valley) is present for the user's fingerprint, and if so, a direction for that ridge (or valley).

In one embodiment, the processor can operate to construct a histogram of values in the ridge flow data structure. As a first example, the ridge flow data structure can include a set of grayscale values indicating ridges of the user's fingerprint. In a second example, the ridge flow data structure can include a set of vector values indicating a direction and confidence of the presence of a fingerprint ridge in the user's fingerprint. In such cases, the processor can determine a value for each cell in the ridge flow data structure and construct a histogram of those values, with the effect of constructing a relatively compressed representation of the user's fingerprint in response to the ridge flow data structure. The histogram represents, for each value in the ridge flow data structure, the number of times that value is repeated in that data structure.

In another embodiment, the processor can operate to construct a different compressed set of values in response to the ridge flow data structure. For example, the processor may compute a hash value in response to the values in the ridge flow data structure, or may compute a hash value in response to the histogram determined in response to the ridge flow data structure.

In one embodiment, the processor can associate the compressed set of values with the individual user's fingerprint, and with the individual user. Associating the user's fingerprint with the user has been generally referred to in this application as "enrollment" of the user's fingerprint.

When the fingerprint image information is enrolled, the processor can access a memory or storage device, such as a database, and maintain the fingerprint information (compressed or otherwise) in that database. The database of fingerprint image information is generally referred to herein as a "fingerprint recognition database". Embodiments, however, are not limited to a database. For example, fingerprint recognition information can be maintained in a different type of data structure other than a database.

In other embodiments, a particular user can be associated with multiple fingerprints, such as one per finger. Similarly, while one embodiment is described as associating an individual example of the user's fingerprint with the particular user, other embodiments are not limited to one individual example of the user's fingerprint. For example, each particular user (or only some users and not others) can be associated with multiple examples of their fingerprint, with the effect that when recognition of the user's fingerprint is attempted, there are multiple possible matches which are associated with that same user and even with that same user's finger.

When the fingerprint recognition sensor receives a 2D fingerprint image for recognition and authentication, the processor attempts to recognize that fingerprint image information as one or more of the 2D fingerprint images which has already been enrolled in the fingerprint recognition database. In one embodiment, the processor can receive fingerprint image information with respect to a user's fingerprint, such as for a user desiring to access the device. In response thereto, the processor can operate on the fingerprint image information to construct a similar data structure as it had earlier enrolled in the fingerprint recognition database. Alternatively, the processor can operate to construct a different data structure that can be comparable with the data structure maintained in the fingerprint recognition database.

The processor can operate to compare the data structure for the new fingerprint information with the data structure for the earlier enrolled fingerprint information. If the data structure for the new fingerprint information makes a sufficiently good match with the data structure for the earlier enrolled fingerprint information, the processor can determine that the new fingerprint is a sufficiently good match for the earlier enrolled fingerprint. The degree of match needed for the processor to determine that there is a sufficiently good match can be responsive to one or more of: (A) the degree of match selected by the user for the earlier enrolled fingerprint, (B) the degree of access control to be imposed on the user for the earlier enrolled fingerprint, (C) the number of times access has been attempted, or recently attempted, for the user for the earlier enrolled fingerprint, (D) the quality of fingerprint image information which the fingerprint information sensor is able to achieve, or other factors.

In alternative embodiments, the processor can receive fingerprint image information with respect to a user's fingerprint, such as for a user desiring to access the device, and compare that information with one or more portions of the aggregated and unified 2D fingerprint image information that was constructed with respect to the earlier enrolled fingerprint. For a first example, the processor can operate to construct a portion of the aggregated and unified 2D fingerprint image information for the new fingerprint to be recognized, and can attempt to match that new portion with one or more portions of the earlier enrolled fingerprint information, as shown in the figure. For a second example, the processor can operate to construct a set of compressed fingerprint information, and can attempt to match that new compressed fingerprint information with compressed fingerprint information for one or more portions of the earlier enrolled fingerprint information, as shown in the figure.

Figure 5:
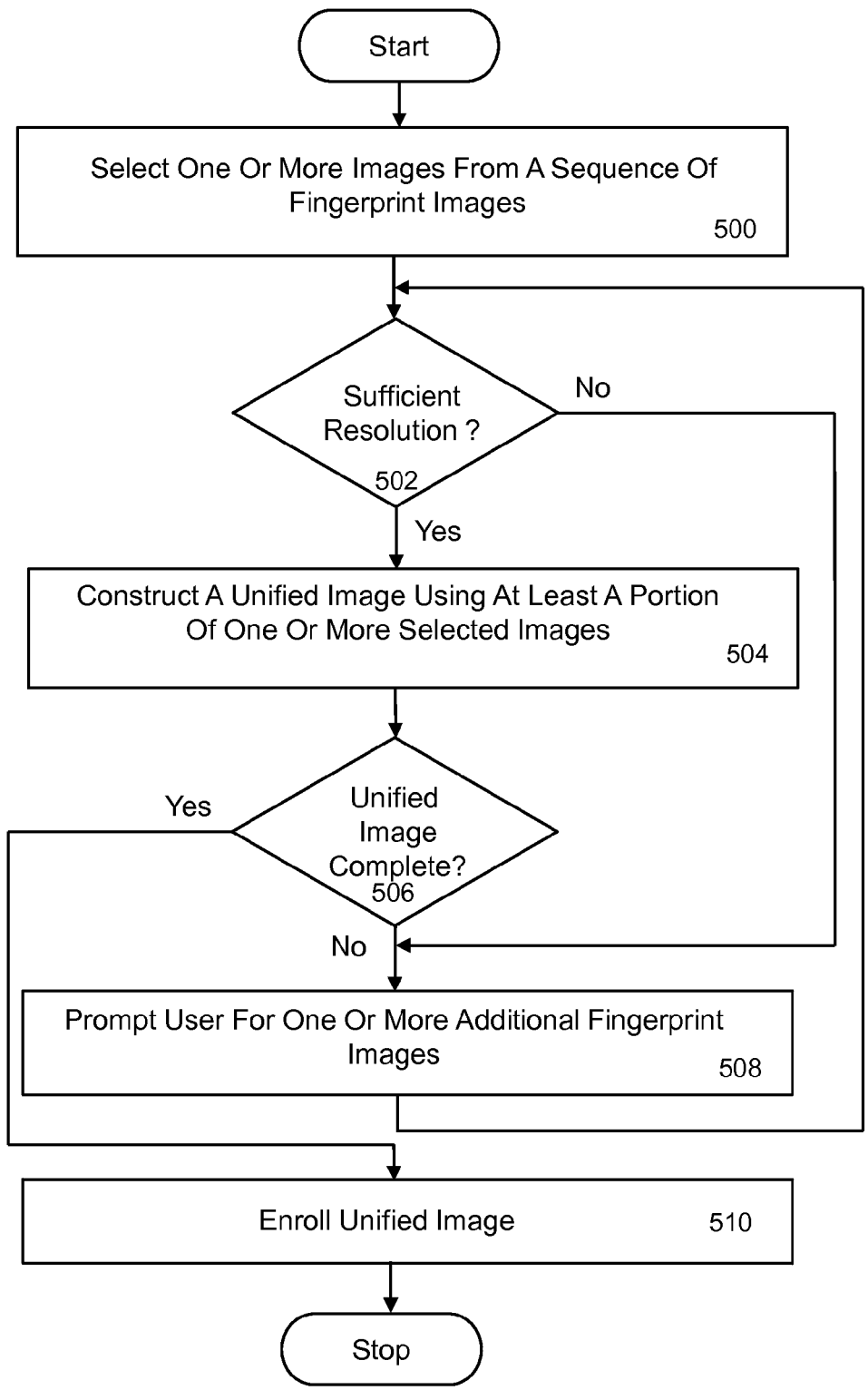
FIG. 5 is a flowchart of a method for constructing a unified fingerprint image.

FIG. 5 is a flowchart of a method for constructing a unified fingerprint image. A sequence of images can be received by a processor connected to the sensing element. The processor can operate to select one or more of that sequence of 2D fingerprint images (block 500). For example, the processor can determine a subset of that sequence of 2D fingerprint images, where that subset includes a subsequence of 2D fingerprint images, each having a relatively superior measure of quality for fingerprint recognition.

The processor can determine which images in the sequence of images are of sufficient resolution to be included in a unified image. Additionally or alternatively, the processor can determine which images in the one or more selected images (e.g., set of images) are of sufficient resolution to be included in a unified image (block 502). The processor can operate to construct a unified image from the selected subsequence of fingerprint images (block 504). For example, the processor can construct a unified image from portions thereof gleaned from the selected subsequence of fingerprint images, such as in response to identifiable features of those individual fingerprint images. The processor can operate to complete the aggregate image by prompting the user for any additional fingerprint image information. For example, the processor presents information to the user with respect to whether any fingerprint image information is missing or is considered of insufficient utility for fingerprint recognition.

The processor can prompt a user for one or more additional fingerprint images if the unified image is not complete (blocks 506 and 508). The prompt can include an image that is presented to the user displaying portions of the unified image that have been or have yet to be collected, or which have been collected but can be improved upon. A user can be presented with readable instructions, such as in the form of text, or pictorial instructions, such as in the form of an arrow or other icon or pictograph, directing the user how to improve on the user's fingerprint image.

When the unified image is complete, the processor can operate to enroll the aggregated fingerprint image in a database describing the user's fingerprint (block 510). For example, the processor can construct a relatively smaller set of information which is nonetheless substantially unique to the user's fingerprint. Similarly, the processor can operates to compare new fingerprint information with enrolled fingerprint information.

The processor can operate to remove noise and other unwanted artifacts from the individual ones of the selected subsequence of fingerprint images. For example, the processor can perform anti-aliasing, blurring, or other signal processing on the fingerprint image information.

The processor can operate to aggregate a unified fingerprint image by averaging the individual ones of the selected subsequence of fingerprint images. For example, the processor can perform an arithmetic average of the grayscale values of the pixel values for corresponding pixels of the collected set of fingerprint images.

Some embodiments can employ fingerprints for user authentication and/or identification, often in combination with other security measures. For example, certain embodiments may employ both a sensed fingerprint and another security measure to gain access to an electronic device, file, data or other sensitive item. Some embodiments may require both the sensed fingerprint and second security measure to access the item.

Other embodiments, however, can operate somewhat differently. For example, certain embodiments may require either a scanned fingerprint or another security measure to gain access. As one example, items (data, applications, devices, and the like) may be classified in different security levels. Items in the first security level may require only a scanned and verified fingerprint to access. Items in the second level may require another security measure to access. Items in a third security level may require both to access.

As yet another option, embodiments may vary the security measure required to access an item with time. For example, one embodiment may require a passcode or another security measure, other than a scanned fingerprint, once a day. Once that security measure is satisfied, inputted, verified or the like, a scanned fingerprint may suffice for the rest of the day to gain access to the item. Thus, the initial access may be based on a first security measure and later access based on another security measure. It should be appreciate that the time that elapses before the first security measure is again required may vary between embodiments. Likewise, the security measure required for initial access versus later access may vary with embodiments. An alternative embodiment may require a fingerprint for initial access and a passcode for later access.

Additionally or alternatively, techniques described herein can be used with respect to other images or other data. For example, techniques described herein may be used with respect to other biometric data, such as gesture recognition, facial recognition, retinal imaging, and otherwise.

While one embodiment of a method is described herein with reference to blocks arranged in a particular order, other embodiments can perform the blocks in a different order, with additional blocks, in parallel or in a pipelined manner, in combination or conjunction, or otherwise. Moreover, while these blocks are described as being performed in particular ways, there is no particular requirement for any such limitation. For example, the blocks may be performed in a different or distinct manner, on different or distinct data structures, or otherwise.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality described herein may be separated or combined in procedures differently in various embodiments of the disclosure or described with different terminology.

What is claimed is:

1. A method for constructing a unified image of biometric data, comprising:
   receiving a sequence of images of biometric data that is captured over a given period of time by a biometric recognition sensor;
   as the images in the sequence are received, repeatedly selecting a sliding window of images of biometric data from the sequence of images of biometric data, wherein each sliding window includes a given number of images in the sequence of images and at least one image that is not included in an immediately preceding sliding window;
   selecting one or more images of biometric data to be included in the unified image of biometric data from at least one of the sliding windows; and
   constructing the unified image of biometric data using the selected one or more images of biometric data.

2. The method as in claim 1, further comprising:
   determining if the unified image of biometric data is complete;
   if the unified image of biometric data is not complete, prompting a user for one or more additional images of biometric data;
   receiving the one or more additional images of biometric data; and
   determining if at least one of the one or more additional images of biometric data is to be included in the unified image of biometric data.

3. The method as in claim 2, wherein prompting a user for one or more additional images of biometric data comprises:
   displaying an image showing the collected or uncollected portions of the unified image of biometric data; and
   displaying instructions directing the user on collecting the one or more additional images of biometric data.

4. The method as in claim 3, further comprising updating the display of the collected or uncollected portions of the unified image of biometric data when at least one additional image of biometric data is included in the unified image of biometric data.

5. The method as in claim 3, wherein the instructions comprise at least one of readable instructions and pictorial instructions.

6. The method as in claim 1, further comprising processing each image of biometric data in the sequence of images to reduce noise or unwanted artifacts.

7. The method as in claim 1, further comprising processing each image of biometric data in a sliding window to reduce noise or unwanted artifacts.

8. The method as in claim 1, further comprising processing each image of biometric data in the sequence of images to improve the image of biometric data.

9. The method as in claim 1, further comprising processing each image of biometric data in a sliding window to improve the image of biometric data.

10. The method as in claim 1, further comprising determining a location in the unified image for the one or more selected images of biometric data to be included in the unified image of biometric data.

11. The method as in claim 1, further comprising determining if each image of biometric data in a slidinq window is of sufficient resolution prior to selecting an image of biometric data.

12. The method as in claim 1, further comprising aggregating individual images of biometric data on a per-pixel basis for pixels substantially co-located in the sequence of images of biometric data.

13. The method as in claim 12, wherein aggregating individual images of biometric data comprises aggregating individual co-located pixels by determining a statistical measure for the co-located pixels.

14. The method as in claim 1, wherein the biometric data comprises at least a portion of one or more fingerprints of a user.

15. The method as in claim 1, further comprising transforming the unified image of biometric data into a compressed data structure.

16. The method as in claim 15, wherein the compressed data structure comprises at least one of a ridge flow data structure, a histogram of values in a ridge flow data structure, and a hash value.

17. A method for constructing and using a unified image of biometric data, comprising:
   receiving a sequence of images of biometric data;
   repeatedly selecting a sliding window of images of biometric data from the sequence of images of biometric data, wherein each sliding window includes a given number of images in the sequence of images and at least one image that is not included in an immediately preceding sliding window;
   selecting one or more images of biometric data to be included in the unified image of biometric data from at least one sliding window;
   constructing the unified image of biometric data using the one or more selected images of biometric data;
   enrolling the unified image of biometric data, wherein the enrollment includes associating the unified image of biometric data with a user; and
   recognizing and authenticating a subsequently received image of biometric data by determining if the image of biometric data matches at least a portion of the unified image of biometric data.

18. The method as in claim 17, wherein enrolling the unified image of biometric data further includes storing the unified image of biometric data in a storage device.

19. The method as in claim 17, further comprising:
   prior to enrolling the unified image of biometric data, determining if the unified image of biometric data is complete;
   if the unified image of biometric data is not complete, prompting the user for one or more additional images of biometric data;
   receiving the one or more additional images of biometric data; and
   determining if at least one additional image of biometric data is to be included in the unified image of biometric data.

20. The method as in claim 19, wherein prompting the user for one or more additional images of biometric data comprises:
   displaying an image showing the collected or uncollected portions of the unified image of biometric data; and displaying instructions directing the user on collecting the one or more additional images of biometric data.

21. The method as in claim 20, further comprising updating the display of the collected or uncollected portions of the unified image of biometric data when at least one additional image of biometric data is included in the unified image of biometric data.

22. A system, comprising:
a biometric recognition sensor including a sensing element adapted to receive a sequence of images of biometric data;
a processor connected to the sensing element and adapted to;
repeatedly select a sliding window of images of biometric data from the sequence of images of biometric data as the images in the sequence are received, wherein each sliding window includes a given number of images in the sequence of images and at least one image that is not included in an immediately preceding sliding window;
select one or more images of biometric data to be included in a unified image of biometric data from at least one sliding window;
construct a unified image of biometric data using at least one selected image of biometric data; and
a display connected to the processor for displaying to a user a prompt for collecting one or more additional images of biometric data.

23. The system as in claim 11, wherein the biometric data comprises at least a portion of one or more fingerprints of the user.

24. The system as in claim 11, wherein the prompt displayed to the user includes an image showing the collected or uncollected portions of the unified image of biometric data and instructions directing the user on collecting the one or more additional images of biometric data.

* * * * *